(No Model.) 2 Sheets—Sheet 1.
C. CORY.
RUDDER INDICATOR.
No. 482,421. Patented Sept. 13, 1892.
Fig. 1.
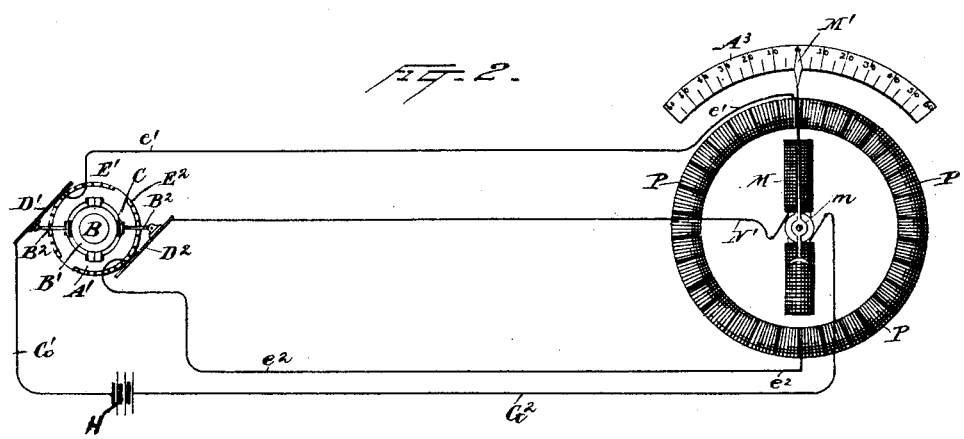
Fig. 2.
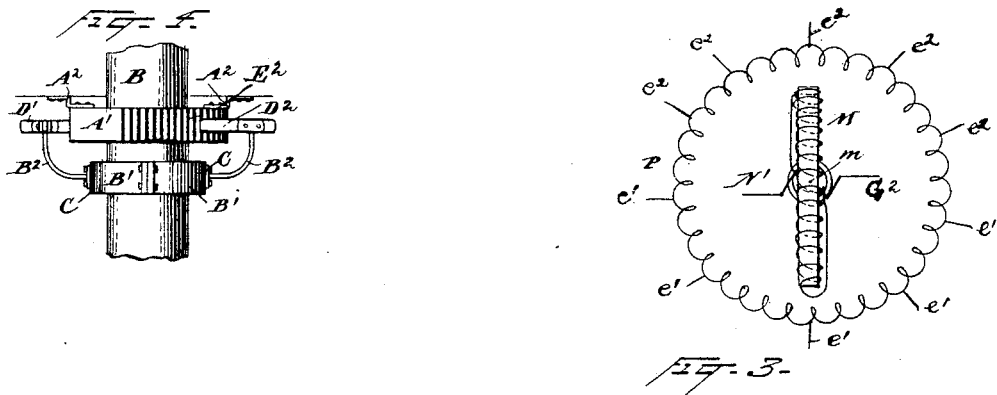
Fig. 4.
Fig. 3.
Witnesses
Norris A. Clark.
Charles R. Searle.
Inventor
Charles Cory
By his Attorney
Thomas Spees Stetson (No Model.) 2 Sheets—Sheet 2.
C. CORY.
RUDDER INDICATOR.
No. 482,421. Patented Sept. 13, 1892.
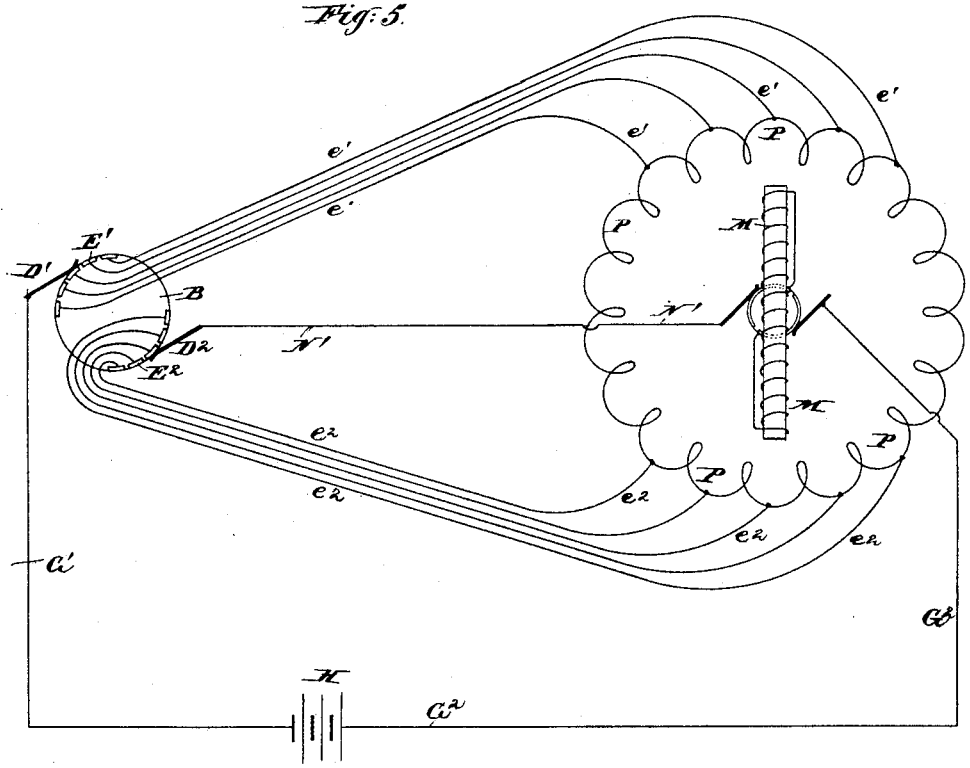

UNITED STATES PATENT OFFICE.

CHARLES CORY, OF NEW YORK, N. Y.

RUDDER-INDICATOR.

SPECIFICATION forming part of Letters Patent No. 482,421, dated September 13, 1892.

Application filed November 24, 1891. Serial No. 412,942. (No model.)

*To all whom it may concern:*

Be it known that I, CHARLES CORY, a citizen of the United States, residing in the city and county of New York, in the State of New York, have invented a certain new and useful Improvement in Rudder-Indicators, of which the following is a specification.

I employ an electric current to signal, automatically, the changes of position of the rudder. The indicator may be at any distant part of the vessel. There may be several indicators at different points in the vessel, all actuated by the same or a different electric current, controlled by the turning of the rudder. Ordinarily the indicating device will shift promptly with each movement of the rudder, however great or small, and the indicator will always keep close to its true line; but if by any chance an opposite condition should temporarily obtain and the indicator should be far out of its true position the magnetic devices employed will nevertheless act upon it and turn it gently into position, and thenceforward it will continue as before to indicate each change as it occurs. There will ordinarily be required several indicating devices, one in the wheel-house, where the steering is initiated, another on each bridge, another in the captain's stateroom, and there may be others at different points, as the first officer's room, and for the perfect apprehension of all signals in emergencies it may be expedient to locate one, also, in the engine-room. Any number may be operated by a proper number of wires, each actuated at the required periods by a single current and arranged to lead the current equally or with sufficient uniformity to serve successfully to the several indicating-stations; or there may be two or other number of sets of wires, each carrying an independently-controlled current, all controlled by the changes of the rudder. For simplicity I will describe the invention as carried out with a single indicating device.

The accompanying drawings form a part of this specification and represent what I consider the best means of carrying out the invention.

Figure 1 is a side elevation partly in vertical section. The remaining figures show details on a larger scale. Fig. 2 is a plan view of the rudder and the parts in immediate contact therewith, being shown on a smaller scale than the indicating device. Fig. 3 is a diagram aiding to illustrate the peculiarities of the indicating device. Fig. 4 is an elevation. Fig. 5 is a diagram showing in plan view five of the electrical conductors on the port side and five on the starboard side, properly connected.

Similar letters of reference indicate corresponding parts in all the figures where they appear.

A is the hull of the vessel, and B the upper portion of the shaft of the rudder, sometimes designated the "rudder-post."

$B'$ $B'$ are sufficiently strong clamps of iron fixed upon the rudder-post so that they revolve therewith.

$D'$ $D^2$ are brushes mounted on sufficiently stout arms $B^2$ $B^2$, fixed on the opposite clamps, respectively, and insulated therefrom by hard rubber or other insulating material C.

$A'$ is a ring of hard wood or other suitable material loosely surrounding the rudder-post but rigidly fixed to the deck above by brackets $A^2$.

$E'$ $E^2$ are severally series of commutator-bars set in the periphery of the ring $A'$ and insulated by hard rubber or other suitable means. Each commutator-bar in the series $E'$ communicates by a separate wire $e'$ with the distant indicating device or devices, and each of the commutator-bars $E^2$ also communicates by an independent wire $e^2$ with a different portion of the same indicating device or devices. Supposing there are fifteen commutator-bars in each series, there are fifteen separately insulated wires $e'$ leading from this series to the distant portion of the ship and there are fifteen separately insulated wires $e^2$ leading from the opposite series, connecting the several commutator-bars $E^2$ with the opposite side of the same indicating device. The wires may be slightly twisted or otherwise held together and there is little difficulty in leading them around any obstacles and causing them to extend to any part of the ship, however distant.

$G'$ is a wire connecting the brush $D'$ with the positive pole of the battery H, and $G^2$ is a wire adding to connect the brush $D^2$ with the negative pole of the same battery. The arrangement insures that one commutator-bar in the series E', the choice depending on the position of the rudder at the time, receives the positive current and is ready to transmit it through its proper wire $e'$, while the other commutator-bars of this series E' and their connecting-wires $e'$ are dead, and that one commutator-bar in the opposite series $E^2$ is similarly negative and is ready, in ordinary language, to recive a current through its connection $e^2$, while the other bars in the series $E^2$, and their several wires $e^2$, are dead.

The indicating devices may be of any size required. Something should depend upon the distance at which they are to be viewed. The wheel-house may require a larger indicator than the bridge. Whatever the size the construction is as follows: M is a long insulated wire formed in a coil of small diameter and inclosing a soft-iron bar mounted on a fixed center $m$, with liberty to turn freely. It is delicately balanced and carries a needle M', which extends over a graduated arc $A^3$, which is graduated in degrees from the center each way, so as to conveniently indicate the fact and the extent of a divergence of the needle from the central position. A gentle current constantly traverses this coil, being led from a suitable battery or other source of electric energy. I have shown it as coming from the same battery H through the aid of the wires N' $G^2$. P is a series of coils of insulated wire extending continuously around in the form of a circular ring and inclosing a corresponding core. (Not shown.) It is fixed in a position concentric to the center $m$, and in such position that the coil M is inclosed and free to revolve or oscillate within it. The several wires $e'$ are connected to equidistant points on the upper side of the ring-coil P, and the wires $e^2$ are connected correspondingly to points on the lower side of such ring-coil.

The circuit traversed by the electric current in the entire apparatus is as follows: Starting from the battery H it flows through the wire G' and the brush D' to one of the commutator-bars E', the choice depending upon the position of the rudder. From here it goes through one of a series of wires $e'$. Fig. 2, for simplicity, shows only one wire in this part of the circuit, but there are in practice a considerable number. The diagram Fig. 5 shows five wires here. The wire $e'$ transmits the current to a correspondingly-located section of the ring-coil P, and the current received in the ring-coil through that particular section flows through that section and through the several sections in the ring-coil until it arrives at a point diametrically opposite in the ring-coil. (See Fig. 3.) The current leaves the ring-coil through one of a series of wires $e^2$. Only one of these wires is shown in Figs. 2 and 3, but five are shown in the diagram Fig. 5. It flows through this wire to a corresponding commutator-bar $E^2$, and from thence it flows through the brush $D^2$, wire N', and suitable contact-pieces to the coil M. This coil is formed around a straight core, and being free to oscillate within sufficient limits moves the index M', (see Fig. 2,) and gives the required indication. The current leaves this coil M through suitable contact-pieces and returns to the battery through the wire $G^2$.

The wire $e'$, which is "live," is always opposite to the wire $e^2$, which is live, but the conditions of the several wires shift as the rudder is turned. A slight turning of the rudder is sufficient to shift the brushes D' $D^2$ from one commutator-bar to the next in the series, with the effect of correspondingly changing the conditions of the wires connected to those commutator-bars, the wire $e'$, which was previously live, becoming now dead, while the wire $e'$, connected with the adjacent commutator-bar, which was previously dead, is now transmitting an active positive current. There is always a positive current flowing through one of the wires $e'$, into a certain point in the ring-coil P, and the wire $e^2$, connected directly opposite, is in the negative condition, and, in ordinary language, leading away the current. It is important that these points of connection of the live wires shall be always as nearly opposite each other as may be. Thus conditioned the current divides and flows in one direction through one half of the ring-coil P and in the opposite direction through the other half of such coil. The effect on the coil M, which is capable of easily turning on its center $m$, is to hold it always correctly in position, pointing parallel to the current thus induced. When the live wires are the wires $e'$ $e^2$, which communicate with the center of their respective series E' $E^2$, of commutator-bars, the rudder is amidships and the indicating-needle M' stands over the mark O, as shown in Fig. 2. Now if the rudder is turned to an appreciable extent to either side of the center line, the shifting of the brushes D' $D^2$ on their respective series of commutator-bars changes the conditions and sends the current through another wire $e'$, leaving the previously-excited wire dead and correspondingly changing the conditions of the wires in the other series $e^2$. The effect is to induce the entrance and emergence of the current at points in the ring-coil a little one side of the points previously utilized, with the effect to correspondingly change the position of the coil M, and the index finger M' will indicate two degrees to starboard or whatever the change of the position of the rudder may be.

So long as the coil M remains nearly in its correct position it would be sensitive to a change of currents even if no other arrangement were made for communicating magnetic force; but my arrangement exerts a reliable force and brings the needle rapidly into position, even if it be by any motion of the vessel or shock of a sea, or of a cannon-ball or any other cause, during a temporary switching of the current turned far out of its correct position. The flow of the current through all portions of my ring-coil, in one direction through one half and in the other direction through the other half, exerts by well-known laws a force which my experiments indicate to be sufficient to reliably turn the needle into the correct position, after which the needle will continue to indicate every change promptly as before.

Modifications may be made without departing from the principle or sacrificing the advantages of the invention. Thus the number of the commutator-bars in each set may be increased or diminished, the number of the wires $e'$ and $e^2$, and the number of points at which such are soldered or otherwise connected to the corresponding points in the ring-coil P being correspondingly varied.

I claim as my invention—

1. In combination with an electro-magnet and indicator at any required place in the ship, a series of commutator-bars arranged in the arc of a circle, supported on a ring capable of being easily detached when required, with a series of wires connecting each commutator-bar to the indicating mechanism independently of the other wires in the series, a brush arranged to move in a corresponding circular path, also supported on a ring capable of being easily detached when required, with suitable electrical connections, and means for causing the rings carrying the brush and commutators to move one relatively to the other as the rudder is turned, and with electric connections to a battery or equivalent source of electric current, all arranged for joint operation as herein specified.

2. In a rudder-indicator, two series of commutator-bars and brushes, each brush moved upon its commutator by the turning of the rudder and arranged one series to control the positive and the other the negative current, in combination with each other and with a source of electric current, electrical connections connecting each commutator-bar to the indicating mechanism independently of the other connections, and an indicating mechanism having an electro-magnet controlled by such current, all arranged for joint operation substantially as herein specified.

3. In combination with a rudder and provisions, substantially as described, for transmitting electric currents varied according as the rudder is turned in one position or another, an indicating device having a suitable index, and a ring-coil P, and provisions for dividing the current and conveying it from one point in such ring-coil in both directions around to the opposite point thereon, as herein specified.

4. In combination with a rudder and provisions, substantially as described, for transmitting electric currents varied according as the rudder is turned in one position or another, an indicating device having a ring-coil P, and provisions for dividing the current and conveying it from one point in such ring-coil in both directions around to the opposite point therein, and having a freely-revolving coil delicately mounted within to serve as an index and conveying a current, as herein specified.

In testimony that I claim the invention above set forth I affix my signature in presence of two witnesses.

CHARLES CORY.

Witnesses:
CHARLES R. SEARLE,
M. F. BOYLE.